United States Patent [19]

Curtis et al.

[11] Patent Number: 5,368,519
[45] Date of Patent: Nov. 29, 1994

[54] METHOD OF MAKING A FOOD PRODUCT FROM A BIRD WING AND FOOD PRODUCT MADE IN ACCORDANCE WITH THE METHOD

[76] Inventors: Michael J. Curtis, 3475 Coronet Ave., Lancaster, Pa. 17601; Eugene G. Martin, 840 S. Cocalico Rd., Denver, Pa. 17517

[21] Appl. No.: 170,463

[22] Filed: Dec. 20, 1993

[51] Int. Cl.$^5$ .............................................. A22C 21/00
[52] U.S. Cl. ................................... 452/135; 452/169; 426/644
[58] Field of Search ............... 452/135, 169, 136, 170; 426/644, 134, 646

[56] References Cited

U.S. PATENT DOCUMENTS

| | | | |
|---|---|---|---|
| 4,938,988 | 7/1990 | Frankhauser | 426/644 |
| 5,071,388 | 12/1991 | Lindert et al. | 452/169 |
| 5,232,397 | 8/1993 | Gagliardi, Jr. | 452/135 |
| 5,267,891 | 12/1993 | Cresson et al. | 452/135 |
| 5,286,229 | 2/1994 | Gagliardi, Jr. | 452/169 |

FOREIGN PATENT DOCUMENTS 2047772  3/1972  Germany ..................... 452/135

Primary Examiner—Willis Little
Attorney, Agent, or Firm—Panitch Schwarze Jacobs & Nadel

[57] ABSTRACT

A method of making a food product from a wing of a bird comprising a middle section having a tip section attached to one end and a drumette section attached to the other end comprises cutting the wing to separate the middle section from the drumette section. The middle section is then cut along a line extending generally parallel to the middle section axis and spaced from the joint shared by the middle section and the drumette by a predetermined distance to remove the joint from the middle section. The tip section is then bent with respect to the middle section to expose at least a portion of both of the middle section bones proximate to the joint of the middle section and the tip section. A score line may be used to facilitate exposure of the two bones. The exposed portions of both of the middle section bones are then pulled to remove the two bones from the middle section to thereby provide a food product comprising a boneless middle section attached to the tip section, the tip section functioning as a convenient handle.

15 Claims, 1 Drawing Sheet

METHOD OF MAKING A FOOD PRODUCT FROM A BIRD WING AND FOOD PRODUCT MADE IN ACCORDANCE WITH THE METHOD

FIELD OF THE INVENTION

The present invention relates generally to a method of making a food product from a bird wing and the food product produced thereby, and more particularly, to such a method which produces a food product comprising an elongated strip of boneless wing meat attached on one end to the wing tip which provides a convenient handle.

BACKGROUND OF THE INVENTION

Birds, such as poultry and fowl, are conventionally eviscerated, dressed and sold either as a whole bird or as severed parts, i.e., breasts, thighs, drumsticks, wings, etc. One of the parts which is sometimes separated and sold is the bird wing, which comprises a middle section, a tip section attached to one end of the middle section, and a drumette section attached to the other end of the middle section. FIG. 1 shows a typical bird wing, including the tip section 12, the middle section 14, and the drumette section 16.

It is generally well known that bird wings are not, in and of themselves, as commercially valuable as some other bird parts, such as breasts and drumsticks, primarily due to the relatively small amount of wing meat available, the size and location of the bones and joints, and the relatively high proportion of skin, bone and joints to wing meat. In addition, the prominence and configurations of the bones and joints within a wing make it more difficult for the wing meat to be removed and consumed, particularly in the setting of a social event, since generally wings are considered to be finger food.

In recent years, there has been an increasing demand for the development of innovative meat products, particularly meat products which require less time for preparation, and which include little or no waste. There has also been an ever-increasing demand for meat products which are boneless or relatively boneless, making such products easier or more convenient to prepare and consume. Hence, products such as boneless chicken breasts, chicken tenders, etc., have enjoyed tremendous commercial success and have obtained enhanced popularity for the respective bird parts from which they are prepared.

Although products such as "hot wings" and "Buffalo wings" have been developed in order to enhance the popularity of wings, bird wings, in general, have not been particularly amenable to enhanced commercial processing and/or preparation methods for reasons related primarily to the relatively small amount of wing meat in relation to the bones, joints, etc., and the difficulty involved in processing the wings in order to make the consumption of the available wing meat more convenient.

The present invention comprises a method for making a unique food product from the middle section of a bird wing. The food product comprises an elongated portion of boneless wing meat attached on one end to the tip section of the wing. The tip section thereby serves as a "handle" for convenient grasping and holding by a person consuming the boneless middle section, thereby making the food product particularly amenable as finger food. The food product can be held by the tip section and dipped into a sauce or gravy similar to that of a fantail shrimp or a prepared crab claw. After consumption of the boneless middle section in one or two bites, the tip section may be conveniently discarded.

SUMMARY OF THE INVENTION

Briefly stated, the present invention comprises a method of making a food product from the wing of a bird comprising a middle section, a tip section, and a drumette section. The middle section has a first joint, a second joint spaced from the first joint, and two bones extending generally parallel to each other between the first and second joints with meat surrounding the two bones. The drumette section is attached to the middle section at the first joint and the tip section is attached to the middle section at the second joint. The method comprises the steps of cutting the wing to separate the middle section from the drumette section. The middle section is then cut along a cut line extending generally perpendicular to the axis of the middle section and spaced from the first joint by a predetermined distance to remove the first joint from the middle section. The tip section is then bent with respect to the middle section to expose a portion of both of the two middle section bones proximate to the second joint. The exposed portions of both of the middle section bones are pulled in a direction generally parallel to the axis of the middle section to remove the two bones from the middle section to thereby provide a food product having a boneless middle section attached to the tip section. In one embodiment, the wing is scored along a line extending through the second joint to facilitate exposure of the middle section bones.

BRIEF DESCRIPTION OF THE DRAWING

The foregoing summary, as well as the following detailed description, will be better understood when read in conjunction with the appended drawing. For the purpose of illustrating the invention, an embodiment which is presently preferred is shown in the drawing. It is understood, however, that this invention is not limited to the precise arrangements and instrumentalities shown. In the drawing.

DETAILED DESCRIPTION OF PREFERRED EMBODIMENT

Figure 1:
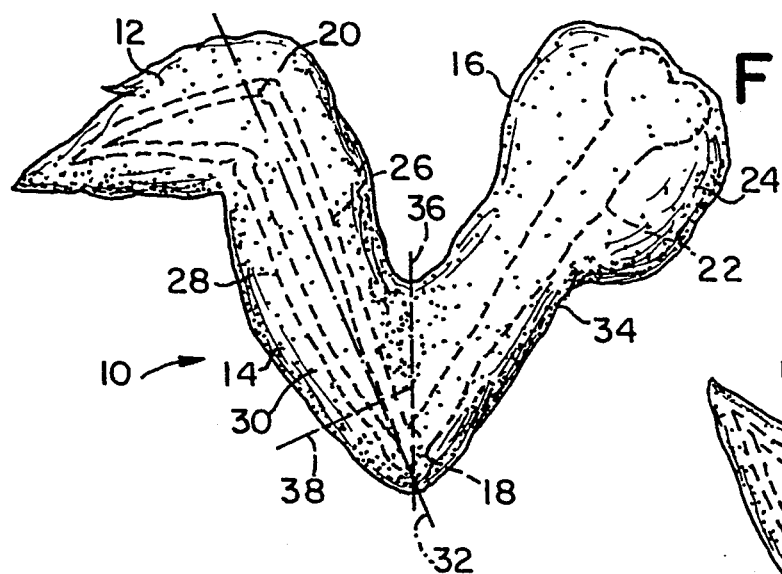
FIG. 1 is a side elevation view of a bird wing which has been severed from a bird.

Referring in detail to the drawing, wherein the same numerals indicate like elements throughout, there is shown in FIG. 1 an elevational view of a bird wing 10 which has been severed from a bird (not shown). The bird wing 10 shown in FIG. 1 can be from any type of fowl or poultry carcass and, therefore, the present invention is equally applicable to all types of fowl or poultry, including duck, turkey, squab, chicken, etc., both wild and domesticated. Because the most widely raised type of bird for human consumption is a chicken, the remainder of the description of the preferred embodiment will be specifically directed to a chicken wing, it being clearly understood that the invention is not so limited.

The chicken wing 10 illustrated in FIG. 1 includes a tip section 12, a middle section 14, and an end or drumette section 16. The drumette section 16 is attached or connected to the middle section 14 by a first joint or knuckle 18. Similarly, the tip section 12 is attached or connected to the middle section 14 by a second joint or knuckle 20.

The drumette 16 generally comprises a single elongated bone 22 extending along the entire length of the drumette 16. The drumette 16 further includes meat 24 which surrounds and is generally attached to the bone 22. When severed from the remainder of the wing 10, the drumette 16 has an appearance similar to that of a small-sized drumstick and, as a result, has developed some commercial acceptance.

The tip section 12 is comprised primarily of skin, cartilage and some bone portions and contains little or no consumable meat. As a result, the tip section 12 is generally considered to have little or no commercial value as a meat product.

The middle section 14 includes two generally elongated bones 26, 28 extending generally parallel to each other between the first joint 18 and the second joint 20. The middle section bones 26, 28 are spaced apart from each other and are each surrounded by meat 30 which is attached to both of the bones 26, 28. The middle section 14 further includes an axis 32 which extends generally parallel to the bones 26, 28. As can be seen from FIG. 1, the amount of middle section meat 30 which is available for consumption is limited, and the ratio of middle section meat to bones 26, 28, joints 18, 20, skin, and other inedible components is low. In addition, the placement of the meat 30 relative to the bones 26, 28 and joints 18, 20 makes removal of the meat 30 impractical and makes consumption of the meat 30 from the bones 26, 28 awkward.

In general, the wing 10 is covered by a layer of skin 34 which helps to hold and support the various portions of the wing meat 24, 30 surrounding the various bones 22, 26, 28. It will, of course, be appreciated by those skilled in the art that wings may also be skinless and so the presence or absence of the skin 34 does not affect the scope of the present invention.

In describing the method of the present invention, it is assumed that the wing 10 is received in the condition shown in FIG. 1 in which the tip section 12, middle section 14, and drumette 16 are attached in substantially the same manner as when the wing 10 is removed from the chicken carcass (not shown). It will be appreciated by those skilled in the art that the method of the present invention may be practiced and a food product in accordance with the present invention may be made from a partial wing of a chicken. For example, the drumette section 16 may be removed from the wing 10 prior to performance of the below-described method steps. It should, therefore, be clearly understood that the present invention is not limited to use of the method in connection with a complete wing 10.

The first step of the method for making the food product is separating the middle section 14 from the drumette section 16. Preferably, the drumette section 16 is separated from the middle section 14 by cutting the wing 10 along a first cut line 36 extending generally through the first joint 18. The removed drumette 16 may then be further processed, sold or otherwise disposed of in any desired manner. It should be understood and appreciated by those skilled in the art that other methods may be employed for removing the drumette 16 from the middle section 14 and that the cut line 36 is shown merely to illustrate but a single way to accomplish this result.

The second step involved in the method of making the food product is removing the first joint 18 or at least the remaining portion of the first joint 18 from the middle section 14 in order to remove all the accompanying cartilage, etc. associated with the first joint 18. In the embodiment illustrated, the first joint 18 is removed by cutting the middle section along a second cut line 38 which preferably extends generally perpendicular to the axis 32 and through the two middle section bones 26, 28. The removed first joint 18 may be disposed of in any desired manner. It will, of course, be appreciated by those skilled in the art that the cut line 38 may be angled with respect to the axis 32 and/or the middle section bones 26, 28, and that the actual placement of the cut line 38 along the bones 26, 28 may vary depending upon the size of the joint 18. The purpose in removing the first joint 18 from the middle section 14 is to remove from the middle section all inedible material associated with the first joint 18.

It will also be appreciated by those skilled in the art that, if desired, the steps of separating the drumette section 16 from the middle section 14 and removing the first joint 18 from the middle section 14 may be accomplished simultaneously, for example, by making a single cut along cut line 38 or along another cut line within the middle section 14 and spaced a predetermined minimum distance from the first joint 18. Whether or not the removal of the drumette section 16 and first joint 18 from the middle section 14 is accomplished in one, two or more steps is not meant to be a limitation upon the present invention.

Figure 2:
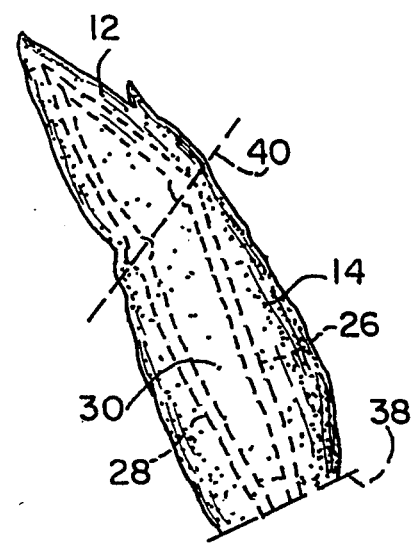
FIG. 2 is an elevational view of a portion of the bird wing of FIG. 1.

The next step in the method of making the food product involves scoring the wing 10 along a third line 40 extending generally proximate to or through the second joint 20. Preferably, the tip section 12 is first moved to be generally axially aligned with the middle section 14 as shown in FIG. 2. Preferably, at least a substantial portion of the skin 34 is scored in this step although the tip section 12 should not be completely severed or removed from the middle section 14.

Figure 3:
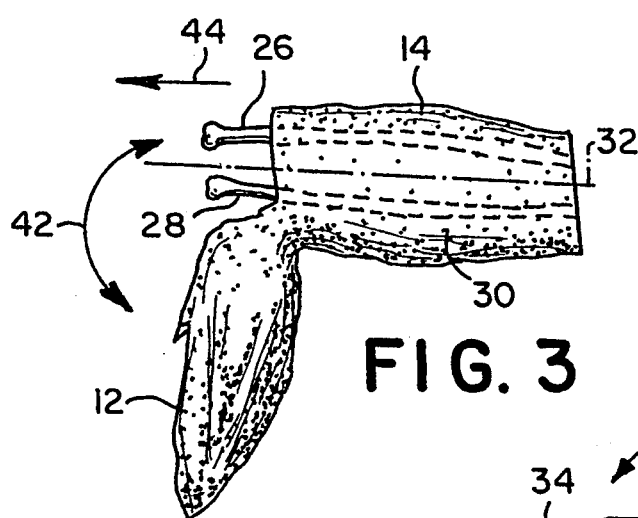
FIG. 3 is a further elevational view of the bird wing portion shown in FIG. 2.

Next, the tip section 12 is moved or bent with respect to the middle section 14 as illustrated by direction arrow 42 to a position as illustrated in FIG. 3 to expose at least a portion of both of the two middle section bones 26, 28, preferably proximate to the second joint 20 and preferably at or near the score line 40. In some applications, the tip section 12 may be bent with respect to the middle section 14 to expose the two middle section bones 26, 28 without the need for scoring the wing 10 as discussed above. Accordingly, in some applications, the above-described scoring step may be omitted.

The next step in the method of making the food product is to grasp or grip the exposed portions of both of the middle section bones 26, 28 and to pull and remove the two bones 26, 28 from the middle section 14. Preferably, the middle section bones 26, 28 are pulled in a direction generally parallel to the axis 32 as illustrated by direction arrow 44 on FIG. 3. However, it is not necessary that the bones 26, 28 be pulled precisely parallel to the axis 32 in order to effectively remove the bones 26, 28 from the middle section 14. Since the larger portions of the bones 26, 28 and all accompanying cartilage, etc., were previously removed as part of the removal of the first joint 18, the two bones 26, 28 are easily removed from the middle section 14.

Figure 4:
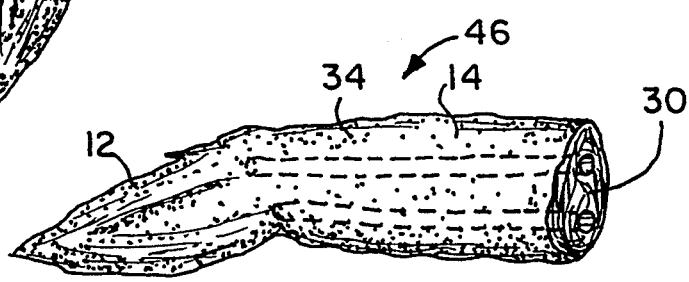
FIG. 4 is a perspective view of a preferred embodiment of a food product made in accordance with the steps illustrated in FIGS. 1-3.

Once the bones 26, 28 have been removed from the middle section 14, the tip section 12 may be bent back to its original position with respect to the middle section 14 or to any other suitable position such as a generally aligned or coaxial position as illustrated in FIG. 4. The completed food product, generally 46, as illustrated in FIG. 4, comprises a completely boneless middle section 14 of easily consumable wing meat 30 surrounded by a layer of skin 34. If desired, the skin 34 may be removed to provide a skinless, boneless middle section 14 (not shown). As illustrated in FIG. 4, one end of the boneless middle section 14 remains attached to the tip section 12. The tip section 12 thus serves as a convenient handle for the meat product 46.

The meat product 46 may be prepared for consumption by frying, baking, broiling or in virtually any other manner known or apparent to those skilled in the art. Once the food product 46 has been prepared for consumption, a consumer may grasp the tip section 12 as a convenient way of holding the food product 46 to facilitate consumption of the boneless middle section 14. If desired, prior to or during consumption, the boneless middle section 14 may be dipped or spread with a suitable sauce, gravy, topping or the like (not shown). In this manner, the consumer is able to hold the food product 46 by the tip section 12 without having the tip section 12 become immersed in the gravy, sauce or the like. Thus, the food product 46 is particularly well adapted for serving as an hors d'oeuvre at cocktail parties or the like since consumption of the food product 46 with or without gravy, sauce or the like is convenient, even with one hand. Once the boneless middle section 14 has been consumed, the tip section 12 may be conveniently discarded.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. A method of making a food product from a wing of a bird, the wing comprising a middle section having a first joint, a second joint spaced from the first joint, two bones generally parallel to each other and extending between the first and second joints, and meat surrounding the two bones, the middle wing section also having an axis extending generally parallel to the bones, the wing further comprising a drumette section attached to the middle section at the first joint and a tip section attached to the middle section of the second joint, the method comprising the steps of:
   (a) cutting the wing to separate the middle section from the drumette section;
   (b) cutting the middle section along a cut line extending generally perpendicular to the axis and spaced from the first joint by a predetermined distance to remove the first joint from the middle section;
   (c) bending the tip section with respect to the middle section to expose at least a portion of both of the two middle section bones proximate to the second joint; and
   (d) pulling the exposed portions of both of the middle section bones in a direction generally parallel to the axis to remove the two bones from the middle section to thereby provide a food product comprising a boneless middle section attached to the tip section.

2. The method as recited in claim 1 wherein steps (a) and (b) are performed simultaneously.

3. The method as recited in claim 1 wherein prior to performing step (c), the wing is scored along a line extending through the second joint.

4. The method as recited in claim 1 wherein the predetermined distance is such that the cut line is positioned slightly beyond the periphery of the first joint toward the second joint.

5. A food product made in accordance with the method of claim 1.

6. A method of making a food product from a partial wing of a bird, the partial wing comprising a middle section having a first joint, a second joint spaced from the first joint, two bones generally parallel to each other and extending between the first and second joints, and meat surrounding the two bones, the middle section also having an axis extending generally parallel to the two bones, the partial wing further comprising a tip section attached to the middle section of the second joint, the method comprising the steps of:
   cutting the middle section along a cut line extending generally perpendicular to the axis to remove the first joint;
   bending the tip section with respect to the middle section to expose at least a portion of both of the two middle section bones proximate the second joint; and
   pulling the exposed portions of both of the two middle section bones in a direction generally parallel to the axis to remove the two bones from the middle section to provide a food product comprising a boneless middle section attached to the tip section.

7. The method as recited in claim 6 further including the step of scoring the wing along a line extending through the second joint prior to bending the tip section.

8. A food product made in accordance with the method of claim 6.

9. A method of making a food product from a wing of a bird, the wing comprising a middle section having a first joint, a second joint spaced from the first joint, two bones generally parallel to each other and extending between the first and second joints and meat surrounding the two bones, the wing further comprising a drumette section attached to the middle section by the first joint and a tip section attached to the middle section by the second joint, the method comprising the steps of:
   (a) separating the middle section from the drumette section;
   (b) removing the first joint from the middle section;
   (c) bending the tip section with respect to the middle section to expose at least a portion of both of the two middle section bones proximate to the second joint; and
   (d) pulling the exposed portions of both of the middle section bones to remove the two bones from the middle section to thereby provide a food product comprising a boneless middle section attached to the tip section.

10. The method as recited in claim 9 wherein steps (a) and (b) are performed simultaneously.

11. The method as recited in claim 9 wherein prior to performing step (c), the wing is scored along a cut line extending through the second joint.

12. A food product made in accordance with the method of claim 9.

13. A method of making a food product from a wing of a bird, the wing comprising a middle section having a first joint, a second joint spaced from the first joint, two bones generally parallel to each other and extending between the first and second joints and meat surrounding the two bones, the wing further comprising a drumette section attached to the middle section by the first joint and a tip section attached to the middle section by the second joint, the method comprising the steps of:

(a) cutting the wing to remove the first joint and the drumette from the middle section;

(b) bending the tip section with respect to the middle section to expose at least a portion of both of the two middle section bones proximate to the second joint; and (c) pulling the exposed portions of both of the middle section bones to remove the two bones from the middle section to thereby provide a food product comprising a boneless middle section attached to the tip section.

14. The method as recited in claim 13, wherein prior to performing step (b), the wing is scored along a line extending through the second joint.

15. A food product made in accordance with the method of claim 13.

* * * * *